(12) United States Patent
Klinger et al.

(10) Patent No.: US 11,813,910 B2
(45) Date of Patent: Nov. 14, 2023

(54) DETECTION SYSTEM AND METHOD FOR ASCERTAINING AN ARTICULATION ANGLE BETWEEN TWO SUB-VEHICLES OF A VEHICLE, AND VEHICLE COMBINATION

(71) Applicant: ZF CV Systems Hannover GmbH, Hannover (DE)

(72) Inventors: Tobias Klinger, Springe (DE); Ralph-Carsten Luelfing, Garbsen (DE); Tobias Werle, Hannover (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 183 days.

(21) Appl. No.: 17/437,059

(22) PCT Filed: Mar. 4, 2020

(86) PCT No.: PCT/EP2020/055664
§ 371 (c)(1),
(2) Date: Sep. 8, 2021

(87) PCT Pub. No.: WO2020/182570
PCT Pub. Date: Sep. 17, 2020

(65) Prior Publication Data
US 2022/0161619 A1   May 26, 2022

(30) Foreign Application Priority Data

Mar. 12, 2019   (DE) .................. 10 2019 106 275.6

(51) Int. Cl.
*B60D 1/62* (2006.01)
*B60D 1/30* (2006.01)
(Continued)

(52) U.S. Cl.
CPC ................. *B60D 1/62* (2013.01); *B60D 1/30* (2013.01); *B62D 15/02* (2013.01)

(58) Field of Classification Search
CPC .. G01C 1/00; B01B 11/26; B60D 1/62; B60D 1/30; B60D 1/36; G06T 7/74; G06K 9/00791
See application file for complete search history.

(56) References Cited

U.S. PATENT DOCUMENTS

| 10,017,115 B2 | 7/2018 | Lavoie |
| 2009/0005932 A1 | 1/2009 | Lee et al. |

(Continued)

FOREIGN PATENT DOCUMENTS

| DE | 102004022113 A1 | 11/2005 |
| DE | 102008029612 A1 | 1/2009 |

(Continued)

*Primary Examiner* — Tan Q Nguyen
(74) *Attorney, Agent, or Firm* — LEYDIG, VOIT & MAYER, LTD.

(57) ABSTRACT

A detection system for determining an articulation angle between two sub-vehicles of a vehicle combination connected in an articulated manner includes a detection device configured to detect an environment, wherein the detection device is arranged on one of the sub-vehicles of the vehicle combination and a detection region of the detection device on a sub-region of a sub-vehicle connected to the one sub-vehicle in an articulated manner is oriented so that detection signals, which characterize the sub-region on the other sub-vehicle, can be generated by the detection device and output. The detection system further includes a processing unit configured to receive the detection signals and determine the articulation angle between the two sub-vehicles based on the detection signals and a projection device designed to image a predetermined pattern onto the sub-region on the other sub-vehicle to create a pattern image on the other sub-vehicle.

7 Claims, 2 Drawing Sheets

(51) Int. Cl.
  *B62D 15/02* (2006.01)
  *G01C 1/00* (2006.01)

(56) References Cited

U.S. PATENT DOCUMENTS

| | | | | |
|---|---|---|---|---|
| 2014/0200759 A1* | 7/2014 | Lu | ............................ | G06T 7/246 |
| | | | | 701/28 |
| 2015/0345939 A1* | 12/2015 | Salter | ...................... | F21S 43/26 |
| | | | | 356/138 |
| 2016/0049020 A1* | 2/2016 | Kuehnle | .............. | G07C 5/0808 |
| | | | | 701/34.4 |
| 2016/0378117 A1* | 12/2016 | Szatmary | ............. | G06V 10/145 |
| | | | | 382/153 |
| 2017/0177973 A1* | 6/2017 | Hu | ............................ | G06T 7/13 |
| 2018/0040129 A1* | 2/2018 | Dotzler | .................. | B60R 11/04 |
| 2018/0319438 A1* | 11/2018 | Herzog | ................. | G06N 20/00 |
| 2020/0215992 A1* | 7/2020 | Plowman | ............... | B60R 11/04 |
| 2020/0307328 A1 | 10/2020 | Köster | | |
| 2021/0027490 A1* | 1/2021 | Taiana | ..................... | B60D 1/06 |

FOREIGN PATENT DOCUMENTS

| | | |
|---|---|---|
| DE | 102011104256 A1 | 7/2012 |
| DE | 102011079632 A1 | 1/2013 |
| DE | 102014211106 A1 | 12/2015 |
| DE | 102016121514 A1 | 5/2017 |
| EP | 3180769 A1 | 6/2017 |
| WO | 2019042882 A1 | 3/2019 |

\* cited by examiner

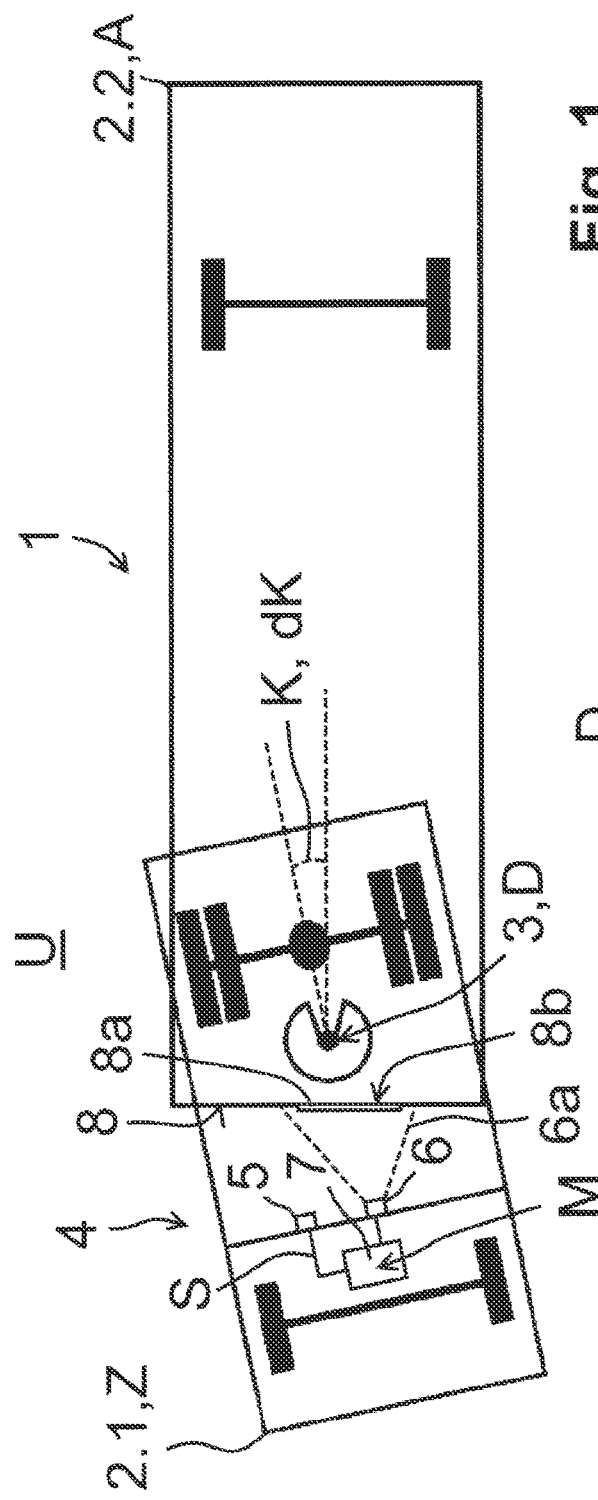
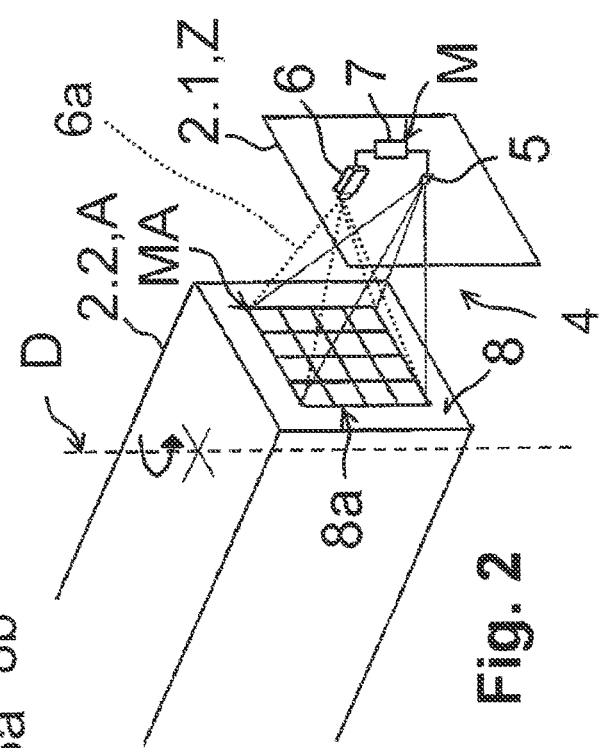

DETECTION SYSTEM AND METHOD FOR ASCERTAINING AN ARTICULATION ANGLE BETWEEN TWO SUB-VEHICLES OF A VEHICLE, AND VEHICLE COMBINATION

CROSS REFERENCE TO RELATED APPLICATIONS

This application is a U.S. National Phase application under 35 U.S.C. § 371 of International Application No. PCT/EP2020/055664, filed on Mar. 4, 2020, and claims benefit to German Patent Application No. DE 10 2019 106 275.6 filed on Mar. 12, 2019. The International Application was published in German on Sep. 17, 2020 as WO 2020/182570 under PCT Article 21(2).

FIELD

The present disclosure relates to a detection system and a method for determining an articulation angle between two sub-vehicles of a vehicle combination which are movably connected to each other. The present disclosure further relates to a vehicle combination consisting of at least two sub-vehicles including such a detection system, in particular for carrying out such a method.

BACKGROUND

In a vehicle combination of a towing vehicle as the first sub-vehicle and a trailer as the second sub-vehicle, for example a semitrailer or a drawbar trailer, it is of particular importance that an articulation angle between the individual sub-vehicles is known. Based on this articulation angle, for example, automated maneuvering of the vehicle combination can take place at depots. Furthermore, with the help of the articulation angle and an estimate of the position or orientation of the trailer, automatic coupling and docking of the trailer to the towing vehicle can be carried out. In addition, as part of driver assistance depending on the determined articulation angle, a virtual top view of the vehicle combination can be created, which can be used in particular in a panoramic view of the vehicle combination.

The determination of the articulation angle is carried out, for example, by odometry, i.e. an estimation of the position of the first sub-vehicle relative to the second sub-vehicle depending on the detected driving dynamics of the vehicle combination, for example steering angle, distance, etc. However, such an estimation is only possible with great accuracy in previous systems during forward travel. During reversing, however, for example when maneuvering, a sufficiently accurate articulation angle cannot be determined by odometry, without having to resort to further sensors.

Furthermore, methods for angle determination are known, which rely on camera systems as detection devices, wherein a detection region of the camera systems is oriented to the following sub-vehicle or the trailer and a measuring mark is mounted on the trailer in this detection region. This measuring mark can be detected by the camera system and the angle can be inferred from the recorded measuring mark image. In DE 10 2014 211 106 A1, a lens field is provided as a measuring mark, from the measuring mark image of which a certain shade of gray can be extracted depending on the angle. Arranging a target object as a pattern on a drawbar of the trailer is described in DE 10 2016 121 514 A1, wherein the target object is recorded by a camera system. The articulation angle is then determined depending on the recorded target object. US 2018/0040129 A1 also describes a barcode on the front surface of the trailer.

In other known methods, the trailer can be detected by means of a detection device and tracked by means of special algorithms, wherein, for example, a contour detection or edge detection takes place, by means of which, for example, the front of the trailer can be tracked over time. Depending on this contour detection or edge detection, it can be inferred how the trailer moves relative to the towing vehicle, from which the articulation angle can be directly estimated. Such a detection system is described for example in EP 3 180 769 A1. In DE 10 2008 029 612 A1, a detection system is further described in which an angle between a wheel of the trailer and the camera system is determined and the articulation angle can be inferred using the vehicle dimensions. Also in DE10 2011 104 256 A1 image features are evaluated and an articulation angle is determined from this for drawbar trailers.

A disadvantage of such detection systems is that very good lighting conditions must be present for the reliable detection of the edges or contours of the trailer or the image marks and also a texture-rich and contrast-rich front of the trailer is necessary to delimit the environment around the vehicle combination from the front of the trailer and thus to allow reliable contour or edge detection.

SUMMARY

In an embodiment, the present disclosure provides a detection system for determining an articulation angle between two sub-vehicles of a vehicle combination connected in an articulated manner. The detection system includes a detection device configured to detect an environment, wherein the detection device is arranged on one of the sub-vehicles of the vehicle combination and a detection region of the detection device on a sub-region of a sub-vehicle connected to the one sub-vehicle in an articulated manner is oriented so that detection signals, which characterize the sub-region on the other sub-vehicle, can be generated by the detection device and output. The detection system further includes a processing unit configured to receive the detection signals and determine the articulation angle between the two sub-vehicles based on the detection signals and a projection device designed to image a predetermined pattern onto the sub-region on the other sub-vehicle to create a pattern image on the other sub-vehicle. The pattern image can be extracted from the detection signals by the processing unit, and the processing unit is configured to determine the articulation angle based on the extracted pattern image.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 shows a top view of a vehicle combination of two movably connected sub-vehicles;

FIG. 2 shows a perspective representation of a section of the vehicle combination according to FIG. 1;

DETAILED DESCRIPTION

Figure 3A:
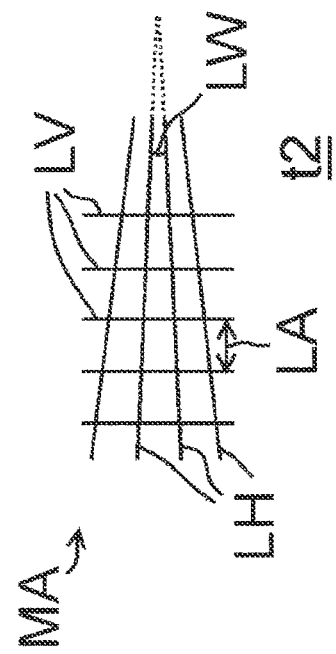
FIG. 3a, 3b show by way of example pattern images in different driving situations.

The present disclosure provides a detection system and a method by which an articulation angle can be determined precisely and easily almost independently of the environmental conditions. The present disclosure also provides a vehicle combination with such a detection system.

According to the present disclosure, a detection system is provided for determining an articulation angle between a sub-vehicle and another sub-vehicle of a vehicle combination which is connected to it in an articulated manner, which detection system has a projection device that is designed to image a predetermined pattern on a sub-region on the other sub-vehicle for creating a pattern image on the other sub-vehicle, wherein the pattern image can be extracted by a processing unit from detection signals and the processing unit can determine the articulation angle on the basis of the extracted pattern image. The pattern image is thereby recorded by a detection device of the detection system, wherein the detection device is arranged on one of the sub-vehicles of the vehicle combination and a detection region of the detection device is at least partially oriented to the sub-region of the other sub-vehicle which is connected to the one sub-vehicle in an articulated manner, so that detection signals can be generated by the detection device and can be output, which detection signals characterize the sub-region including the pattern image on the other sub-vehicle. A processing unit of the detection system is further designed to receive the detection signals and to determine the articulation angle between two sub-vehicles from the extracted pattern image on the basis of the detection signals. Extracting the pattern image is to be understood to mean here that the processing unit analyzes the detection signals and filters out the pattern image from the detected environment. This can be done by pattern recognition, including for the predetermined pattern, for example.

A towing vehicle or a trailer, for example a semitrailer, drawbar trailer, etc. are understood as sub-vehicles, wherein the articulation angle between the towing vehicle and the trailer or between two trailers can be determined with the detection system depending on the orientation of the detection device and the projection device. The components of the detection system can be located either only on one of the sub-vehicles, for example on the towing vehicle or on one of the trailers, or distributed over multiple sub-vehicles. The pattern is then projected onto the corresponding other sub-vehicle and recorded by means of the detection device.

As a result, the advantage is already achieved that the detection system can be flexibly or variably adapted to the respective vehicle combination. The pattern is freely selectable as well as the arrangement of the detection system. To generate the pattern image only an area (sub-region) on the respective sub-vehicle is therefore necessary, for example on a front side of the trailer, to which the detection device is also oriented. This can be determined during the assembly of the components of the detection system, wherein a subsequent adjustment is also easily possible. Processing of the sub-region or the application of markers to the respective sub-vehicle is not necessary for this since the projection can preferably take place independently of the surface of the sub-region. The position of the pattern or the shape of the pattern can, if necessary, also be easily adapted to the existing surface. Also, the ambient lighting has only a slight influence on the imaging and detection of the pattern image, wherein a position can also be selected for the projection which is only slightly influenced by the ambient lighting.

Preferably, it is provided that the processing unit is designed to determine geometric information from the extracted pattern image and to infer the articulation angle between one sub-vehicle and the other sub-vehicle depending on the geometric information. Accordingly, it is advantageously assumed that the pattern image also changes according to simple geometric rules when the articulation angle changes, since a projection plane in which the pattern is imaged on the sub-region shifts or pivots relative to the projection direction. These changes in the pattern image can be detected and the articulation angle can be inferred from them in a simple manner.

Preferably, it is further provided that the processing unit is designed to determine a line angle and/or a line spacing between horizontal lines and/or vertical lines of the pattern image, wherein the geometric information characterizes a geometric form of the pattern image, and the geometric shape of the pattern image changes depending on the articulation angle.

Accordingly, the line angle or a line spacing can be determined from the pattern image as geometric information which characterizes the pattern image itself and from which the articulation angle follows. The pattern image can therefore be designed very simply, for example as a kind of grid of horizontally and vertical lines, which intersect at a right angle in a certain initial state, for example during straight-ahead travel.

The initial state may be a driving state in which the articulation angle is known, so that a known articulation angle can be assigned to a certain pattern image or a line angle or a line spacing. Since the line spacings or the line angles of vertical or horizontal lines are very easy to determine and these also change as a function of the articulation angle in a known geometric dependency, this geometric information is a very accurate and also easily detectable indicator, from which an unknown angle can be easily and reliably derived. In principle, however, patterns with curved lines or diagonally running lines or other geometric shapes are also possible, from which geometric information can be derived which characterizes the respective geometric shape and which also changes in a comprehensible manner as a function of the articulation angle.

Preferably, it is further provided that the processing unit is designed to determine a line angle change and/or a line spacing change from the determined line angle and/or the determined line spacing starting from an initial state with a known articulation angle, for example during straight-ahead travel, and then to infer the currently prevailing articulation angle from an articulation angle change.

Accordingly, a geometric change of the pattern image can be detected in a simple and reliable manner. From the geometric change, it is then advantageous to infer the change in the articulation angle, since these two changes are always related to each other. The basis for this are simple geometrical considerations with knowledge of the vehicle dimensions, in particular the position of the sub-region or the projection plane relative to the pivot point between the sub-vehicles.

According to a complementary (redundant) or alternative embodiment, it is provided that the processing unit is designed to compare the extracted pattern image with stored reference patterns, wherein an articulation angle is assigned to each stored reference pattern for the respective vehicle combination or for the respective sub-vehicle, and to infer the respective assigned articulation angle in the event of a match with a reference pattern. Accordingly, the articulation angle can also be determined by a simple actual-target pattern comparison, wherein the reference patterns for the respective vehicle combination or the respective sub-vehicle are to be determined in advance.

Preferably, it is provided that the detection system is arranged on a towing vehicle and/or at least one trailer as part of the vehicle combination for determining the articulation angle between the towing vehicle and the trailer connected in an articulated manner or between two trailers of the vehicle combination connected in an articulated manner. For this purpose, it may preferably be provided that the projection device is arranged on the towing vehicle or the at least one trailer, in each case as a sub-vehicle, and the sub-region and the projection plane on the trailer or the towing vehicle as another sub-vehicle. Accordingly, the pattern image can be imaged either on the towing vehicle or on one of the trailers and the projection device can be arranged on the corresponding other sub-vehicle, so that a change in the position of the projection plane relative to the projection device results from a change of the articulation angle. The detection system can thus be very flexible and variable to use and easy to fit retrospectively.

Preferably, it is further provided that the projection device can project the predetermined pattern in the visible or non-visible spectrum on the sub-region. Accordingly, depending on the application the pattern image can be formed on the sub-vehicle by targeted selection of the radiation, wherein the detection device is then designed accordingly to detect this radiation. Radiation in the non-visible spectrum can be selected, for example infrared radiation, which has the advantage that projection and detection can also be carried out almost independently of the environmental conditions. In addition, projection and detection are also possible with a soiled surface and almost independently of the surface quality of the sub-region.

Preferably, it is further provided that apart from imaging of the predetermined pattern by the projection device, the sub-region of the other sub-vehicle is free of means for determining the articulation angle. Accordingly, for example, no patterns, barcodes, or the like applied to the sub-region as such means, for example printed or otherwise fastened, are provided, which are recorded by the detection device and from which an articulation angle can be determined in the processing device. Advantageously, the determination of the articulation angle with the detection system is therefore based solely on the analysis and processing of the patterns projected by the projection device.

According to the method for determining an articulation angle between a sub-vehicle of a vehicle combination, which is connected to another sub-vehicle of the vehicle combination in an articulated manner, at least the following steps are provided: projecting a predetermined pattern onto a sub-region of the other sub-vehicle for creating a pattern image on the other sub-vehicle; detecting the pattern image and generating and outputting detection signals which characterize the sub-region on the other sub-vehicle; receiving and processing the detection signals such that the pattern image is extracted from the detection signals and the articulation angle is determined on the basis of the extracted pattern image. The vehicle combination has in the described manner a detection system, which is designed in particular to carry out the method.

According to FIG. 1, a multi-part vehicle combination 1 of a towing vehicle Z as the first sub-vehicle 2.1 and a towed trailer A (semitrailer) as the second sub-vehicle 2.2 is shown, wherein the vehicle combination 1 is formed by way of example as an articulated truck. In principle, however, the described subject matter may also be provided on a vehicle combination 1 with a drawbar trailer or a central axle trailer as a towed trailer A (not shown). The vehicle combination 1 may also have more than two sub-vehicles $2.i$, with i=1, 2, . . . N connected to each other in an articulated manner (megaliner, long truck).

According to FIG. 1, the trailer A is connected to the towing vehicle Z in an articulated manner by means of a king pin 3, whereby the trailer A can turn relative to the towing vehicle Z, for example when cornering, around a rotation axis D running through the king pin 3. This creates a certain articulation angle K between the towing vehicle Z and the trailer A. For determining this articulation angle K, the vehicle combination 1 has a detection system 4, wherein according to this exemplary embodiment the detection system 4 has a projection device 5, a detection device 6 and a processing unit 7.

The projection unit 5 is designed to project or image a predetermined pattern M onto a sub-region 8a of a front surface 8 of the trailer A and thus to generate a pattern image MA in a certain projection plane 8b on the trailer A. The projection plane 8b is thereby determined by the spatial position of the front surface 8 of the trailer A. The projection device 5 is in this version firmly connected to the towing vehicle Z and oriented towards the trailer A, the front surface 8 of which accordingly faces the towing vehicle Z.

The detection device 6 is also arranged on the towing vehicle Z according to this exemplary embodiment, wherein a detection region 6a of the detection device 6 is oriented to the front surface 8 of the trailer A and thereby at least to the sub-region 8a. The detection device 6 can thus detect at least the pattern image MA imaged on the front surface 8 of the trailer A in the projection plane 8b.

The detection device 6 is designed for example as an image-recording sensor, in particular a camera, with which the pattern image MA can be detected on the front surface 8 of the trailer A. The detection device 6 generates detection signals S for this purpose depending on a detected environment U, in particular the detected pattern image MA, and outputs them to the processing unit 7. The processing unit 7 is designed to process the detected environment U based on the sensor signals S. Since the detection region 6a of the detection device 6 is also oriented to the sub-region 8a, the processing unit 7 can extract the pattern image MA from the sensor signals S and analyze it.

The projection device 5 may be designed to image the predetermined pattern M onto the sub-region 8a in the projection plane 8b in the visible spectrum or in the non-visible spectrum, for example in the infrared range. The projection device 5 is designed for example as a laser for the visible spectrum and as a light-emitting diode for the non-visible spectrum, especially in the infrared range. The detection device 6 is matched in a corresponding manner to the type of radiation of the projection device 5 used, so that the pattern image MA can be detected. An image in the non-visible spectrum has the advantage that the front surface 8 of the trailer A can be optically designed almost arbitrarily, since the detection device 6 does not "perceive" this in the processing and analysis of the pattern image MA.

The extracted pattern image MA is different during straight-ahead travel FG of the vehicle combination 1 from the extracted pattern image MA when cornering FK with a certain articulation angle K, since the projection plane 8b on the front surface 8 of the trailer A shifts or pivots relative to the projection device 5 during rotation of the trailer A relative to the towing vehicle Z. Accordingly, there are also changes in the projected or extracted pattern image MA which are dependent on the prevailing articulation angle K between the towing vehicle Z and the trailer A.

Figure 3B:
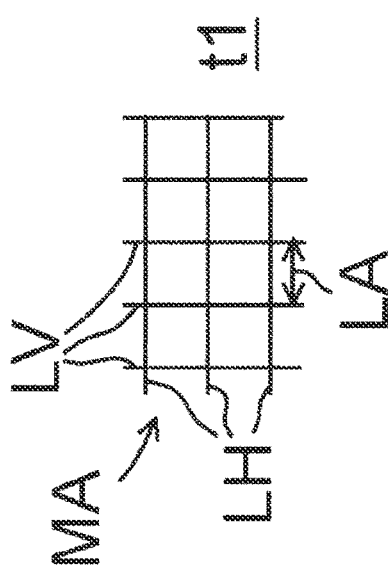
Figure 4:
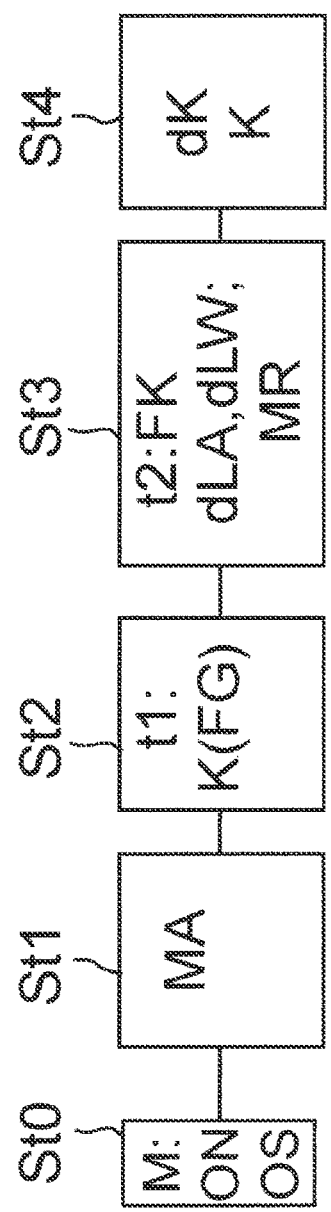
FIG. 4 shows a flowchart of a method.

Thus, for example, horizontal lines LH in the pattern image MA, which run parallel to each other during straight-ahead travel FG (see FIG. 3a), are tilted relative to each other at a certain line angle LW when cornering (see FIG. 3b), so that they no longer run parallel to each other. Furthermore, vertical lines LV of the pattern image MA, which run parallel to each other during straight-ahead travel FG, will approach each other when cornering, so that a line spacing LA between the vertical lines LV changes depending on the articulation angle K. For vertical lines (not shown), these effects combine accordingly.

Thus, from line spacings LA and/or from line angles LW between the respective lines LH, LV of the pattern image MA conclusions can be drawn as to which articulation angle K is currently present between the trailer A and the towing vehicle Z. The derivation of the articulation angle K can be carried out, for example, independently at any time (absolute), or by a time-related or incremental consideration of the line spacings LA and/or the line angle LW, in that a line spacing change dLA and/or a line angle change dLW is/are determined.

In the absolute determination, a calibration is preferably carried out or in advance or it is ensured that the image plane of the pattern image MA is parallel to the front surface 8 of the trailer A and the predetermined pattern M with the predetermined line spacings LA and line angles LW is imaged. The articulation angle K can then be determined at any time from the changed line spacings LA or line angles LW by means of the geometric considerations.

With the incremental approach, the line spacing LA and/or the line angle LW can be determined at a first time t1, at which the articulation angle K is known, for example, during previously specified straight-ahead travel FG (K=0°, and then at a second time t2 with an unknown articulation angle K. The unknown articulation angle K or an articulation angle change dK can then be inferred from the resulting line spacing change dLA and/or the line angle change dLW. This follows directly from a geometric model which is stored in the processing unit 7 in a suitable manner.

The derivation of the articulation angle change dK is possible in a simple manner since the position of the projection plane 8b on the front surface 8 relative to the detection device 6 and to the projection device 5 for the first time t1 is known exactly. This follows from the knowledge of the articulation angles K and the vehicle dimensions for this first time t1. The pattern image MA recorded at the first time t1 with the respective line distances LA and/or line angles LW can then be assigned to this driving state. In the event of a change in the articulation angle K during cornering FK, the unknown articulation angle K or the articulation angle change dK can then be inferred using the known vehicle dimensions and the pattern image MA recorded then or the line spacings LA and/or line angles LW present then by simple geometric considerations, which are taken into account in the geometric model.

The first time t1 does not necessarily have to be during straight-ahead travel FG. Rather, any time is possible at which an articulation angle K is known or an assignment between a pattern image MA and an articulation angle K can take place. The determination of the articulation angle change dK or of the unknown articulation angle K then takes place during the incremental determination, always starting from the pattern image MA assigned to this initial state or the associated line spacings LA and/or line angles LW.

Alternatively or in addition, it is also possible that for each articulation angle K reference patterns MR are stored in the processing unit 7 and the pattern image MA for an unknown articulation angle K is compared with these reference patterns MR. in the event of a match to a reference pattern MR, the correspondingly assigned articulation angle K can be output. The reference patterns MR are then to be determined exactly or calibrated in advance for the respective vehicle combination 1 in order to be able to resort to them in operation.

The analysis of the pattern image MA by means of the geometric model or the reference pattern MR is to be adapted accordingly when using a drawbar trailer or a central axle trailer, wherein the position of the projection plane 8b on the respective trailer A is known or can be estimated for the respective articulation angle K from the vehicle dimensions.

According to a variant which is not claimed, the projection device 5 can also be omitted. Accordingly, the predetermined pattern M is not projected onto the front surface 8 of the trailer A in the sub-region 8a. Rather, the predetermined pattern M is applied directly in any manner to the front surface 8 of the trailer A in the sub-region 8a. The applied pattern M is then virtually identical to the pattern image MA and with suitable orientation of the detection region 6a of the detection device 6 is output to the processing unit 7 by means of the detection signals S. Also in this case, the line spacings LA or the line angles LW between the lines LH, LV of the pattern M or the pattern image MA change depending on the predetermined pattern M, so that the articulation angle K can be inferred from the changes of the pattern image MA. This is also carried out in this exemplary embodiment by means of a geometric model stored in the processing unit 7 or by a comparison with reference patterns MR.

The advantage of the embodiments with the projection device 5 is however that a simple retrofit capability is provided, since the trailer A itself can remain unchanged and only the corresponding components 5, 6, 7 of the detection system 4 on the towing vehicle Z are to be retrofitted. As a result, even with a replacement of the trailer A, an articulation angle determination can continue to be carried out without the respective trailer A being retrofitted or converted accordingly. The determination of the sub-region 8a into which the pattern image MA is projected can be adapted to the setting of the detection region 6a and vice-versa for each trailer A in a simple and targeted manner by mounting the projection device 5 or the detection device 6 accordingly. It can thus be ensured independently of the selected trailer A that the pattern image MA can actually be projected and recorded.

In addition, a simple change of the pattern image MA can be carried out by exchanging the predetermined pattern M, wherein an adaptation of the geometric model to this newly predetermined pattern M can be omitted if the vehicle dimensions do not change. However, the geometric change of the pattern image MA depending on the articulation angle K remains the same.

Furthermore, in the event of a projection of the predetermined pattern M, the surface composition of the front surface 8 of the trailer A can be almost arbitrarily implemented. Even in the event of fouling, a projection with subsequent detection can still take place, whereby a determination of the articulation angle K can take place almost independently of environmental conditions.

According to FIG. 2, both the projection device 5 and the detection device 6 and the processing unit 7 are arranged on the towing vehicle Z. In principle, however, it is also possible that individual ones of these components 5, 6, 7 or all components are arranged on the trailer A and then are oriented to the towing vehicle Z.

Furthermore, such a detection system 4 can also be arranged between two trailers A in a vehicle combination 1 of more than two sub-vehicles 2.$i$, with i=1, 2, . . . N; N>2, (long truck, megaliner) to determine the articulation angle K between two trailers A. The described system for determination of the articulation angle K is transferable in an identical manner to this situation, wherein the projection device 5 and the detection device 6 are then preferably arranged on the same trailer A or sub-vehicle 2.$m$, with m>1, and are oriented to the adjacent sub-vehicle 2.$n$, with n>2 and m=/n, in order to project the pattern image MA onto it and then to be able to detect and analyze it.

According to the present disclosure, the method for determining the articulation angle K can be carried out as follows, for example:

In an initial step St0, an initialization takes place, for example with the starting of the vehicle combination 1 or when it is determined that a trailer A is attached. As a result, the predetermined pattern M is projected by the projection device 5 in the visible or non-visible spectrum OS, ON onto the sub-region 8$a$ on the front surface 8 of the trailer A or the corresponding sub-vehicle 2.$i$.

In a first step St1, at a first time t1 at a known articulation angle K, for example during a predetermined straight-ahead travel FG (K=0°, the line spacing LA and/or the line angle LW between the lines LH, LV are determined from the pattern image MA previously detected by means of the detection device 6.

Subsequently, in a second step St2 at a second time t2 at a still unknown articulation angle K, for example during cornering FK, the pattern image MA is again detected by means of the detection device 6. In a third step St3, a line spacing change dLA and/or a line angle change dLW is determined from the pattern image MA (incremental approach), which arises due to the pivoting projection plane 8$b$ relative to the initial state in the first step St1, if the trailer A rotates relative to the towing vehicle Z or the sub-vehicles 2.$i$ rotate relative to each other around the axis of rotation D. In a fourth step St4 the currently still unknown articulation angle K or an articulation angle change dK is inferred from this line spacing change dLA and/or line angle change dLW by means of a geometric model based on the known articulation angle K in the first step St1.

Alternatively or additionally, the pattern image MA determined in the second step St2 can be compared with stored reference patterns MR and the respective assigned articulation angle K can be output in the event of a match with a reference pattern MR.

Alternatively or additionally, from the pattern image MA determined in the second step St2 in the event of prior calibration of the image plane, the articulation angle K can also be determined directly from the line spacing LA and/or the line angle LW by means of the geometric considerations (absolute approach).

The steps St2 and St3 take place continuously in predetermined time steps while the vehicle combination 1 is travelling. The determined articulation angle K can then be output to other vehicle systems for further processing.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS 1 vehicle combination
2.$i$. ith sub-vehicle, with i=1, 2, . . . N
3 king pin
4 detection system
5 projection device
6 detection device
6$a$ detection region of the detection device 6
7 processing unit
8 front surface of trailer A
8$a$ sub-region of the front surface 8
8$b$ projection plane on the front surface 8
A trailer
D axis of rotation
dK articulation angle change
dLA line spacing change
dLW line angle change
FG straight-ahead travel
FK cornering
K articulation angle
LA line spacing
LH horizontal line
LV vertical line
LW line angle
M predetermined pattern
MA pattern image/projected pattern
MR reference pattern (for specific articulation angle)
N number of sub-vehicles 2.$i$
ON non-visible spectrum
OS visible spectrum
S detection signal
t1 first time
t2 second time
Z towing vehicle
St0, St1, St2, St3, St4 Steps of the method

The invention claimed is:

1. A detection system for determining an articulation angle between two sub-vehicles of a vehicle combination connected in an articulated manner, the detection system comprising:
   a detection device configured to detect an environment, wherein the detection device is arranged on one of the sub-vehicles of the vehicle combination and a detection region of the detection device on a sub-region of a sub-vehicle connected to the one sub-vehicle in an articulated manner is oriented so that detection signals, which characterize the sub-region on the other sub-vehicle, can be generated by the detection device and output;
   a processing unit configured to receive the detection signals and determine the articulation angle between the two sub-vehicles based on the detection signals; and
   a projection device designed to image a predetermined pattern onto the sub-region on the other sub-vehicle to create a pattern image on the other sub-vehicle,
   wherein the pattern image can be extracted from the detection signals by the processing unit,
   wherein the processing unit is configured to determine the articulation angle based on the extracted pattern image,
   wherein the processing unit is configured to determine geometric information from the extracted pattern image and to infer the articulation angle between the one sub-vehicle and the other sub-vehicle depending on the geometric information,
   wherein the geometric information characterizes a geometric shape of the pattern image and the geometric shape of the pattern image changes depending on the articulation angle,
   wherein the processing unit is configured to determine a line angle and/or a line spacing between horizontal lines and/or vertical lines of the pattern image, and
   wherein the processing unit is configured to determine a line angle change and/or a line spacing change from the determined line angle and/or the determined line spacing, starting from an initial state with a known articulation angle, and to infer the currently prevailing articulation angle therefrom and from an articulation angle change.

2. The detection system as claimed in claim 1, wherein the detection system is arranged on a towing vehicle and/or on at least one trailer as a sub-vehicle of the vehicle combination for determining the articulation angle between the towing vehicle and the trailer which is connected thereto in an articulated manner, or between two trailers of the vehicle combination connected to each other in an articulated manner.

3. The detection system as claimed in claim 2, wherein the projection device is arranged on the towing vehicle or at least one trailer as the one sub-vehicle and the sub-region and the projection plane lie on the trailer or the towing vehicle as an-other sub-vehicle.

4. The detection system as claimed in claim 1 wherein the projection device is configured to project the predetermined pattern onto the sub-region in the visible spectrum or the non-visible spectrum.

5. The detection system as claimed in claim 1 wherein apart from imaging of the predetermined pattern by the projection device, the sub-region on the other sub-vehicle is free of any identifier for determining the articulation angle.

6. A vehicle combination with a detection system as claimed in claim 1.

7. A method for determining an articulation angle between a sub-vehicle of a vehicle combination, which is connected to another sub-vehicle of the vehicle combination in an articulated manner, the method comprising:
   projecting a predetermined pattern onto a sub-region of the other sub-vehicle for creating a pattern image on the other sub-vehicle;
   detecting the pattern image and generating and outputting detection signals that characterize the sub-region on the other sub-vehicle;
   receiving and processing the detection signals such that the pattern image is extracted from the detection signals and the articulation angle is determined on the basis of the extracted pattern image;
   determining geometric information from the extracted pattern image and the articulation angle between the sub-vehicle and the other sub-vehicle as a function of the geometric information, wherein the geometric information characterizes a geometric shape of the pattern image and the geometric shape of the pattern image changes as a function of the articulation angle;
   determining a line angle and/or a line spacing between horizontally extending lines and/or vertically extending lines of the pattern image;
   determining a line angle change and/or a line spacing change from the determined line angle and/or line spacing, starting from an initial state with a known articulation angle; and
   inferring a currently prevailing articulation angle from an articulation angle change.

* * * * *